United States Patent [19]

Iwao et al.

[11] 3,759,087
[45] Sept. 18, 1973

[54] SAMPLING APPARATUS FOR ANALYZING GAS

[75] Inventors: Norito Iwao; Akira Ezaki; Shigemi Hayashi; Yukio Nakamori; Keihachiro Tanaka; Nobukuni Nakano, all of Kitakyushu; Toshihito Morita, Chiba, all of Japan

[73] Assignee: Nippon Steel Corporation, Tokyo, Japan

[22] Filed: Apr. 8, 1971

[21] Appl. No.: 132,484

[52] U.S. Cl. .................. 73/23, 73/421.5 A, 55/523
[51] Int. Cl. ............................................. G01n 1/00
[58] Field of Search ....................... 73/23, 421.5; 55/523

[56] References Cited
UNITED STATES PATENTS

| | | |
|---|---|---|
| 3,486,382 | 12/1969 | Vivares et al. .................. 73/421.5 |
| 3,229,526 | 1/1966 | Kennedy ........................ 73/421.5 |
| 3,457,787 | 7/1969 | Maatsch et al. ................. 73/421.5 |
| 2,409,669 | 10/1946 | Dietert ............................. 73/16 |
| 2,648,857 | 8/1953 | Kelly et al. ...................... 73/324 X |
| 3,070,990 | 1/1963 | Krinov ........................... 73/421.5 X |

Primary Examiner—Herbert Goldstein
Attorney—Wenderoth, Lind & Ponack

[57] ABSTRACT

A gas sampling apparatus, which is a high temperature dry sampling apparatus, which makes it possible to carry out quickly and accurately a stabilized analysis of dust-rich, high temperature and high humidity gas generated from a gas generating source, such as, for example, a shaft furnace, converter, open-hearth furnace and the like, comprising, as a typical example, a ceramic filter fitted to the tip of a gas outlet pipe provided within a cooling cylinder, a mechanism for blowing gas for removing dust, said mechanism being set near the filter and a thermal expansion absorbing mechanism installed in the gas outlet pipe.

6 Claims, 4 Drawing Figures

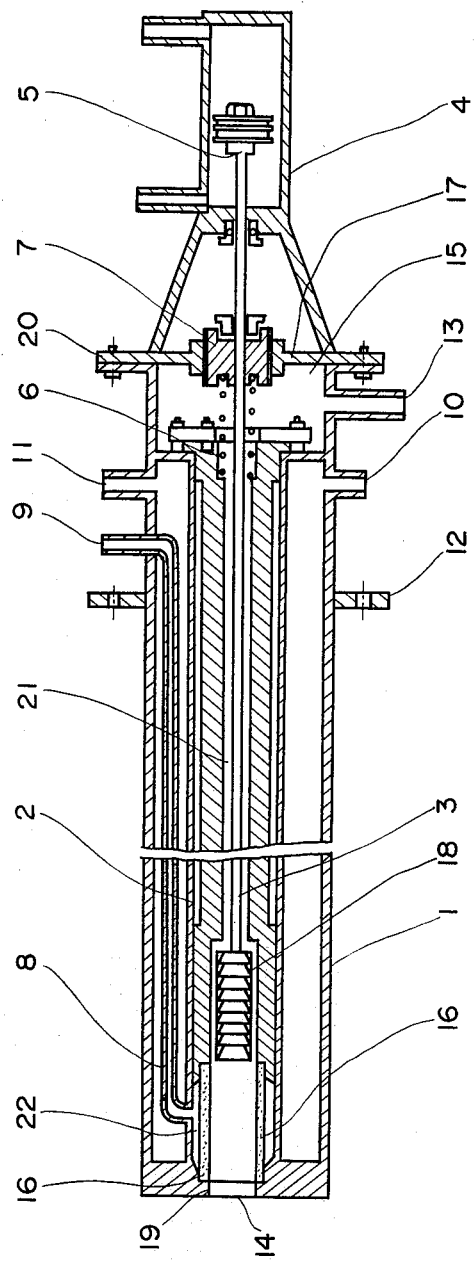

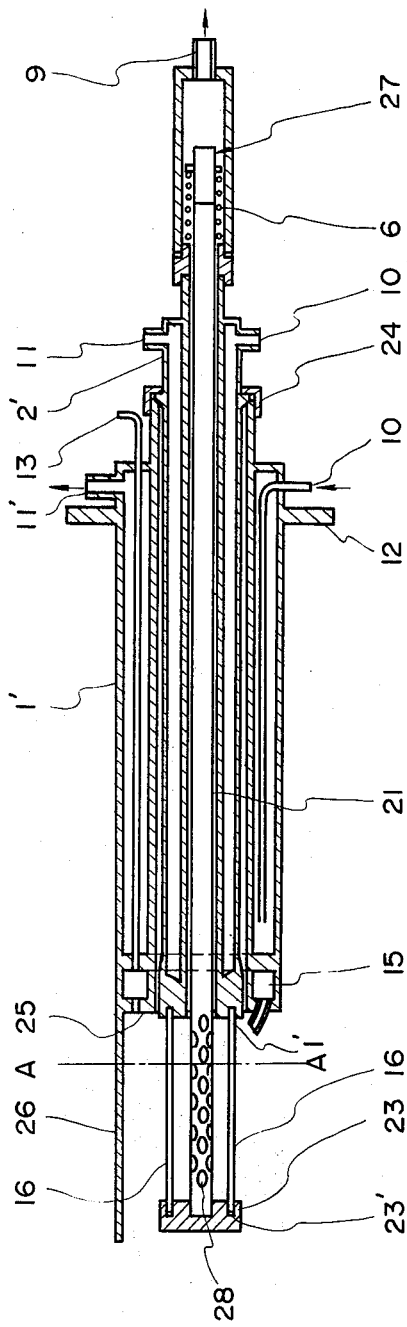
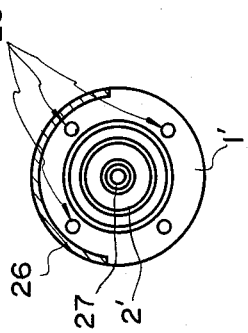

SAMPLING APPARATUS FOR ANALYZING GAS

BACKGROUND OF THE INVENTION

1. Field of the Invention

This invention relates to a sampling apparatus for collecting and precisely analyzing dust-rich, high temperature and high humidity gases generated from such gas generating sources as, for example, a shaft furnace, converter, open-hearth furnace or any other furnace.

2. Description of the Prior Art

The conventional sampling apparatus designed to be used in a high temperature, dust-rich atmosphere is usually one wherein gases are collected while washing the tip of the sampling apparatus with water or steam, and water contained in the gases is separated therefrom. However, in such system, there are disadvantages, namely:

a. that, because the water or steam and the gas must be separated from each other, there is a long delay in completing the analysis;

b. that, when using an analyzer which utilizes infrared rays, water becomes the cause of errors; and c. that, in a sampling system wherein the tip of the sampling apparatus is washed with water or steam, $CO_2$ or the like is absorbed into the water during the sampling and causes an error in the analysis.

In addition, there is a so-called dry sampling system using no washing water. In this system a compressed gas is used to blow away accumulated dust. However, on account of the water contained in the gas, which acts as a binder, the dust becomes a sludge, which is deposited on the sampling apparatus and is, therefore, difficult to remove with only compressed air.

There is a further proposal for providing the tip of the sampling apparatus with a ceramic filter. However, this proposal is also attended with a disadvantage that the filter is subjected to the thermal expansion due to high temperature gases, and unless measures for compensating for thermal expansion are taken, the filter is likely to break on account of internal stress generated in the filter.

On the other hand, there is a keen demand for a sampling apparatus which can analyze the compositions of gases accurate-ly and quickly and is moreover durable in fields in which the use of a sampling apparatus is indispensable. For example, in the operation of a converter, in which a dynamic control of the control system is now used to control the end-point steel bath composition or more particularly the end-point carbon content of the steel bath with high precision, there is carried out a method of estimating the steel bath composition by using a decarburizing speed meter. According to this method the amount of carbon escaping from the steel bath, that is, the decarburizing speed, is calculated from the analysis values of CO and $CO_2$ contained in the exhaust gas and the flow volume thereof in the final period of blowing, and the end-point carbon content of the steel bath may be estimated from the relation with the carbon content of the molten pig iron in the initial period or from the correlative relation between the decarburizing speed value and the carbon content in the steel bath obtained from data in the past. The precision of the estimation by this method depends on an accurate and durable sampling apparatus which must serve as an analyzer for CO and $CO_2$ contained in the exhaust gas. However, when incorporating an input signal obtained by the detection of data from troublesome operations such as gas sampling and analysis into a control loop, there is a primary problem, that is, a delay in detection. In order to cut down the said delay in detection to the minimum for the sampling apparatus and further more positively to reduce the said delay, the position at which the sampling for the detection is carried out must be at a point in the apparatus where much more rigorous conditions exist than at points where sampling has heretofore been done, and even measurement at a temperature above 1,000°C. is required, as things stand today. However, as the converter exhaust gas not only has a high temperature, but also has a high dust content and humidity, the water and dust coagulated by heat become dried and clog the detecting element, even when the element is cooled. Therefore, with existing sampling apparatus as is described above, such problems as these can hardly be solved.

SUMMARY OF THE INVENTION

In view of these facts, as a result of various investigations, the present invention has been made and has succeeded in solving these problems.

An object of the present invention is to provide means for carrying out a stable sampling operation even in an environment having a high temperature, dust content and humidity.

Another object of the present invention is to reduce the time loss in sampling by setting the sampling apparatus as close as possible to the gas generating source.

These objects are achieved in the present invention by an apparatus in which a ceramic filter is mounted on the tip of a gas outlet pipe provided within a cooling cylinder, placing a mechanism for blowing a gas for removing dust near said filter and providing the gas outlet pipe with a mechanism for absorbing thermal expansion.

BRIEF DESCRIPTION OF THE DRAWINGS

The subject matter of the present invention will be explained with reference to the following drawings in which:

FIG. 1 is a side sectional view illustrating the overall construction of an apparatus according to the present invention;

FIG. 2 is a side sectional view illustrating another embodiment of an apparatus according to the present invention;

FIG. 3 is a cross-section on line A—A in FIG. 2; and

DESCRIPTION OF THE PREFERRED EMBODIMENT

Figure 4:
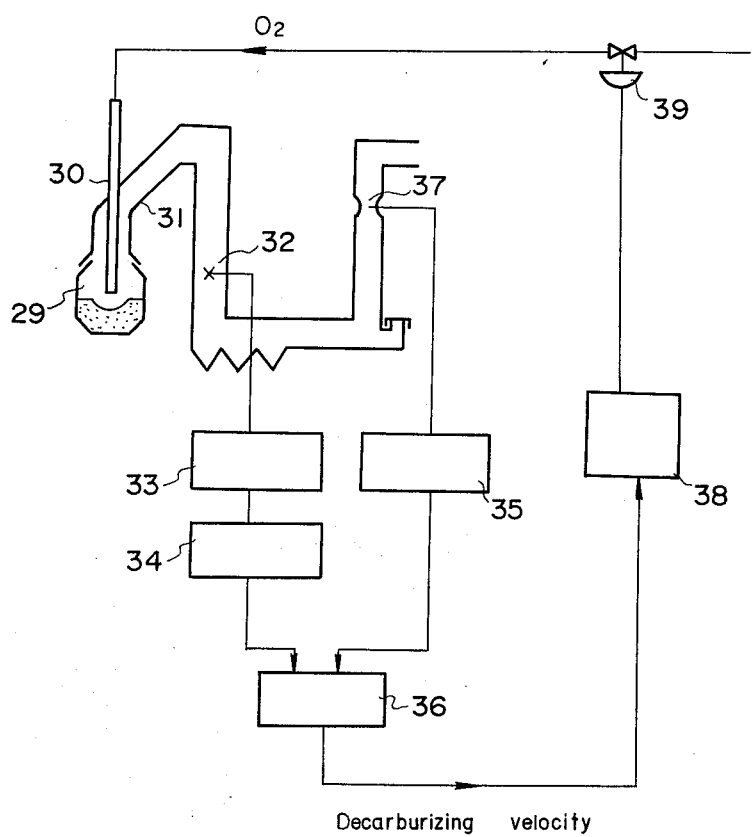
FIG. 4 is a schematic diagram of an example of an application of an apparatus of the present invention as used in converter equipment.

In FIG. 1, an annular cooling cylinder 1 is provided having an annular cooling chamber therein into which cooling water is introduced through a cooling water inlet 10 and from which is discharged through a cooling water outlet 11 so as to effect cooling. A hollow filter holding push-rod 2 is inserted into the center of cooling cylinder 1. A mechanical dust removing rod 3 is within push-rod 2 and is driven by a cylinder 4 and piston 5. Further, an annular ceramic filter 16 is provided between a stepped part 19 in the tip part of the cooling cylinder 1 and the push-rod 2 and said push-rod 2 is held resiliently against filter 22 with a spring 6 supported on a fixed plate 17 the spring acting as a thermal expansion absorbing mechanism. This mechanism is not limited to that described above but may also be in the form as in the embodiment shown in FIG. 2. Further, the push-rod 2 may be fixed and may be operatively associated with the filter 16 by providing an ordinary expansion space at the tip of the push-rod 2.

Around the outer peripheral part of the ceramic filter 16 there is provided an annular space 22 out of which a sampling gas outlet pipe 8 extends through the cooling cylinder 1. The rod 3 is slidable in a sealing packing 7. A plurality of dish-shaped metal pieces 18 or brushes for scraping off dust deposited on the filter 16 are mounted the tip of the dust-removing rod 3 so that the dust can be removed from the filter by the pieces 18 during the reciprocating motion of the piston 5. Further, between the above-mentioned push-rod 2 and dust-removing rod 3 there is formed a clearance 21 sufficiently large for gases for blowing back to pass therethrough, as will be later described. A mounting flange 12 is provided on cylinder 1.

The gas to be collected by suction by a pump from a sampling outlet 9 of the outlet pipe 8 from the outer peripheral part of the ceramic filter 16, enters the cylinder through a sample gas intake 14 and is collected through a sample gas outlet pipe 8 after being filtered through the ceramic filter 16. Therefore, by leading this gas to an analyzer or the like, any desired analysis can be made.

The dust deposited on the ceramic filter 16 is removed by the following operation.

A compressed gas pipe 13 for supplying gas for blowing back is connected to a chamber 15 constructed around one end of the cooling cylinder 1, and compressed gas, for example, an insert gas such as $N_2$ gas is fed to said chamber 15 under a pressure of 4 to 7 kg./cm²., passes through the clearance between the dust removing rod 3 and filter holding push-rod 2 and blows away the dust deposited on the surface of the filter 16.

Meanwhile, by applying an operating air pressure alternately to both sides of the piston 5, the reciprocating piston 5 reciprocates and in accordance therewith the mechanical dust removing rod 3 having the dust removal means 18 at the tip operates to remove the dust accumulated on the surface of filter while reciprocating along the filter surface. Further, when the filter 16 is to be replaced by a new one, this can be done by removing a flange 20 closing the rear part of the chamber 15 on the cooling cylinder 1 and inserting a new filter by using the push-rod 2.

In the embodiment shown in FIG. 2, which has a structure different from the structure of the embodiment shown in FIG. 1, the cooling cylinder has an annular inner cylinder 2' and an annular outer cylinder 1' each of which has an annular cooling chamber therein. The inner cylinder 2' has a ceramic filter 16 mounted on one end thereof and is water-cooled by introducing cooling water through a cooling water inlet 10 and discharging it through a cooling water outlet 11. The outer cylinder 1' protects the inner cylinder 2' and has means for blowing off the dust accumulated on the surface of the ceramic filter 16 comprising a compressed gas pipe 13 extending through the cooling chamber for feeding a compressed gas to annular chamber 15 around the front end of outer cylinder 1' and having blow back holes 25 opening out of the end surface thereof from the outer cylinder 1'. Further, this outer cylinder 1' has cooling water through a cooling water supplied thereto inlet 10' and discharged through the cooling water outlet 7'. The outer cylinder 1' has a mounting flange 12' thereon and the inner cylinder 2' is fixed to the outer cylinder 1' by a coupling nut 24. The ceramic filter 16 is held between the tip of the inner cylinder 2' and a holding metal piece 23 positioned in front of the inner cylinder 2'. This holding metal piece 23 is resiliently held against the end of filter 16 by a spring 6 and a hollow rod 27 having holes 28 therein, the spring bearing on the end of inner annular cylinder 2' and a flange on rod 27, and rod 27 extending through inner cylinder 2' and having piece 28 on the end thereof. These elements form a thermal expansion absorbing mechanism. Needless to say the thermal expansion absorbing mechanism is not specifically limited to the above-mentioned elements, but it may be a structure, wherein, for instance, an ordinary expansion space is provided in a filter holding groove 23' provided in the holding metal piece 23, and asbestos or the like is embedded in this space. Instead of being a hollow rod, element 27 can be an ordinary solid bar and a clearance such as clearance 21 in FIG. 1 can be formed between the rod and the inside periphery of the inner cylinder 1' so that the gas may be sucked through this clearance.

When the sample gas is sucked by a pump through the outlet port 9, the gas is drawn through the ceramic filter 16 from the outside, and is filtered thereby, and the thus introduced gas passes through the interior of the rod 27 from the holes 28 within the ceramic filter and is drawn out through the port 9.

In the thus formed sampling apparatus illustrated in FIG. 2, the sampling operation is carried out as follows: at first, when an instruction is given to start the sampling operation, the operation is commenced by operating a suction pump (not illustrated). The sample gas drawn through the tip is cleaned in a dehumidifying cooler, filter paper or filter and is fed to the analyzer. A cover 26 is provided over the ceramic filter 16.

Next, when an instruction to stop sampling comes, the suction operation is, however, still further continued for several minutes in order to remove the gas remaining in the rod 27. After the passage of the set time, the suction pump is stopped and thereupon the compressed inert gas is passed through the outer cylinder 1', whereby the dust on the ceramic filter 16 at the tip is removed, and the sampling apparatus is ready for the nest sampling instruction.

Now, as a pratical example of the use of the apparatus of the present invention, there will be described an example, wherein the apparatus of the present invention is used in a method of controlling a steel bath composition during the operation of a converter. In FIG. 4, 29 is a converter, 32 is an apparatus according to the present invention, 33 is a sampling apparatus, 34 is a CO and $CO_2$ analyzer, 35 is a flow meter for measuring the volumes of flow of exhaust gases, 36 is a multiplier, 37 is a flow meter detecting element and 38 is a controlling device.

The apparatus of the present invention is very effectively utilized when carrying out the control of a steel bath composition by using the apparatuses shown in FIG. 4. That is, in the method of controlling a steel bath composition, wherein the steel bath composition is to be controlled to a command (a value to be obtained) by the following measures: investigating the relation between the carbon content of the steel bath and the decarburizing velocity beforehand and estimating the carbon content of the steel bath from the decarburizing velocity and adjusting the amounts of oxygen and mill scales, which are manipulated variables in the control system, by means of the controlling device 38, the apparatus of the present invention is utilized for obtaining the decarburizing velocity. That is, the exhaust gas generated from the converter 29 is collected by the apparatus of the present invention to supply the sample gas to the analyzer 34, wherein the CO and $CO_2$ contents of the gas are analyzed, and the decarburizing velocity is obtained by multiplying the thus obtained analysis value of the sample gas by an exhaust gas flow value by using the multiplier 36. Thus, with the apparatus of the present invention a continuous stable sampling operation can be performed and also the time loss can be kept to about 3 seconds. Therefore, the control system of the steel bath composition by using the apparatus of the present invention can be carried out much cheaper and more precisely than by an open loop controlling system using a conventional computer.

Further, the apparatus of the present invention can be utilized not only in such a converter operation as described above, but also for various uses, for instance, for judging conditions in a shaft furnace such as a reduction condition and water leakage and the like by carrying out a shaft furnace top gas analysis, or in such a place as a sintering plant wherein dust is present in the exhaust gas in a large amount.

The advantages of the apparatus of the present invention may summarized as follows:

1. As the apparatus of the present invention is a high temperature dry sampling apparatus wherein a ceramic filter is used at the tip of the apparatus and the periphery is cooled, the response time is short and the apparatus is durable and an accurate sampling operation can be maintained even at 1,100°C.

2. As the ceramic filter is held by a resilient spring, any breakage caused by the internal stress generated by the difference in thermal expansion from the holding metal piece can be prevented.

3. The time schedule of the suction and dust removal can be varied so that the requirement of each process may be met by a sequence controlling device in the entire sampling system.

4. The dust deposited on the ceramic filter and pipe paths can be intermittently blown off from the side of the filter on which the dust is deposited by a compressed inert gas.

What is claimed is:

1. A sampling apparatus for analyzing gases, comprising a hollow cylindrical ceramic filter, an annular cooling cylinder having an annular end surface at a free end thereof against which one end of the ceramic filter is engaged, a gas removal means concentric with said ceramic filter and extending through said annular cooling cylinder for collecting gas passing through said ceramic filter and carrying it away from said filter, a thermal expansion compensating means comprising a filter engaging member engaging the other end of said filter and extending through said annular cooling cylinder and spring means acting on said filter engaging member and urging said filter engaging member against said filter to urge said filter into engagement with said annular end surface of said cooling cylinder, and compressed gas supply means in said apparatus directing a flow of compressed gas along the cylindrical surface of said ceramic filter on the opposite side of said filter from said gas removal means.

2. A sampling apparatus as claimed in claim 1 in which said annular cooling cylinder extends around said annular filter and said annular surface faces away from the free end of said cooling cylinder, and said filter engaging means is an annular rod extending through said cooling cylinder having the end thereof engaged with said filter, and said spring means urges said rod toward the free end of said annular cylinder, and said gas removal means comprises an annular chamber around said ceramic filter and a gas outlet pipe extending from said annular chamber through said annular cooling cylinder.

3. A sampling apparatus as claimed in claim 2 in which the inside surface of said rod is in substantial alignment with the inside of said ceramic filter, and said gas supply means includes a chamber around the end of said rod remote from said ceramic filter and a compressed gas inlet to said chamber, whereby compressed gas admitted to said chamber through said inlet is passed along said annular rod for blowing dust off the inside surface of said ceramic filter.

4. A sampling apparatus as claimed in claim 3 further comprising a mechanical wiper means within said annular rod and reciprocally movable within said ceramic filter, and wiper moving means connected to said wiper means for reciprocally moving said wiper means for mechanically wiping dust from the internal surface of said ceramic filter.

5. A sampling apparatus as claimed in claim 1 in which said annular surface on said annular cooling cylinder is on the free end of said annular cooling cylinder facing outward of the free end and said hollow cylindrical ceramic filter projects beyond said annular cooling cylinder, and said filter engaging means is a member engaging the free end of said ceramic filter and a rod extending through said ceramic filter and said annular cooling cylinder on the end of which said member engaging the ceramic filter is mounted, the other end of said rod being engaged by said spring means for urging said rod in the direction of said other end and said member against said ceramic filter and said ceramic filter against said annular surface, said rod being hollow and having holes therein within said ceramic filter and constituting said gas removal means.

6. A sampling apparatus as claimed in claim 5 in which said compressed gas supply means comprises a compressed gas chamber around the free end of said annular cooling cylinder adjacent the end of said ceramic filter which is against said annular surface, a compressed gas inlet to said chamber, and said chamber having outlets directed toward the exterior surface of said ceramic filter, whereby compressed gas admitted to said chamber through said inlet is passed along said ceramic filter for blowing dust off the outside of said ceramic filter.

* * * * *